United States Patent
Lin et al.

(10) Patent No.: US 9,028,111 B2
(45) Date of Patent: May 12, 2015

(54) LENS MODULE FOR LED LIGHT SOURCES

(71) Applicant: Genius Electronic Optical Co., Ltd., Taichung (TW)

(72) Inventors: Yi-Jie Lin, Taichung (TW); Chih-Chieh Wu, Taichung (TW); Yen-Wei Ho, Taichung (TW)

(73) Assignee: Genius Electronic Optical Co., Ltd. (TW)

( * ) Notice: Subject to any disclaimer, the term of this patent is extended or adjusted under 35 U.S.C. 154(b) by 287 days.

(21) Appl. No.: 13/679,270

(22) Filed: Nov. 16, 2012

(65) Prior Publication Data
US 2014/0126218 A1    May 8, 2014

(30) Foreign Application Priority Data
Nov. 8, 2012 (TW) ................ 101128789 A

(51) Int. Cl.
*F21V 5/04* (2006.01)
*F21V 5/08* (2006.01)
*G02B 19/00* (2006.01)
*F21W 131/103* (2006.01)
*F21Y 101/02* (2006.01)

(52) U.S. Cl.
CPC ... *F21V 5/04* (2013.01); *F21V 5/08* (2013.01); *F21W 2131/103* (2013.01); *F21Y 2101/02* (2013.01); *G02B 19/009* (2013.01); *G02B 19/0061* (2013.01)

(58) Field of Classification Search
CPC .................................................. F21V 5/04
USPC ................... 362/311.02, 311.01, 311.06
See application file for complete search history.

(56) References Cited

U.S. PATENT DOCUMENTS

2011/0320024 A1* 12/2011 Lin et al. ............... 700/98
2012/0051047 A1* 3/2012 Lu et al. ................ 362/235

FOREIGN PATENT DOCUMENTS

| TW | M380480 | * | 5/2010 |
| TW | M380480 U | | 5/2010 |
| TW | M380486 U | | 5/2010 |
| TW | 201100719 A | | 1/2011 |
| TW | 201111702 A | | 4/2011 |
| TW | M420709 | | 1/2012 |

* cited by examiner

*Primary Examiner* — Elmito Breval
(74) *Attorney, Agent, or Firm* — Baker & McKenzie LLP

(57) ABSTRACT

A lens module for LED light sources including: a lens body; and an LED light source received in a recess of the lens body. By the conditions of Z1>Z2 and Z3>Y1, and with the shape of light incident surface and the position of LED light source, a light deflection effect is achieved. This allows light emitted from the LED light source to be refracted by the light incident surface and then emitted by the light exiting surface, generating an excellent light deflection effect, thereby increasing illumination in width at the road or public squares and increasing utilization rate of the LED light source.

10 Claims, 8 Drawing Sheets

LENS MODULE FOR LED LIGHT SOURCES

CROSS-REFERENCE TO RELATED APPLICATION

This application claims priority from Taiwan Patent Application No. 101128789, filed on Aug. 9, 2012, the contents of which are hereby incorporated by reference in their entirety for all purposes.

BACKGROUND

1. Field of the Invention

The present invention relates to a lens module for LED light sources, and more particularly to a lens module capable of shifting illumination areas.

2. Brief Description of the Related Art

Recently, considering the requirements of energy-saving and environmental protection, lighting equipment manufacturers and research units gradually employ light emitting diodes (LED) as light sources in lighting equipment. The LED is a solid semiconductor device that can convert electrical energy directly into light. The LED has advantages such as small volume, short response time, low power consumption, and low contamination.

However, comparing to conventional light sources, LED has a smaller light divergence angle and thus light emitted therefrom is more concentrated, causing brightness differences between the central section and the peripheral section of the illuminated area; that is, the light source may not have uniform illumination. Therefore, many lighting equipment employ secondary optical lenses to alter the optical characteristics of the LED. LEDs of different purposes should be used with different kinds of lenses to achieve different lighting effects.

The LED currently used in road lamp is disposed in an LED lens; this allows light emitted from the LED to be deflected and refracted, to adjust the light projection direction. However, road lamps are generally disposed at road-sides, and since the refracting surface of conventional lens is usually a simple spherical surface or an aspheric structure, the light emitted from the LED therein is concentrated at the area below the road lamp and may not provide uniform illumination on the road. Thus, it results in ineffective street illumination.

Therefore, in order to solve the foregoing problems, Taiwan utility model patent No. M420709 provides a light incident surface (the surface facing the LED) of the lens body; the light incident surface is consisted of three curved surfaces. By the improved lens structure, light emitted from the LED provides uniform illumination on the road, increasing the illumination range, and reduce occurrence of glare.

However, the illumination demands of a road-side and a road are different. The illumination area of a road is larger than that of a road-side, and the illumination uniformity demands of a road is higher than that of a road-side. Accordingly, a light deflection effect is further required to direct the light to the road, thereby increasing the utilization rate of the light source of the road lamp.

SUMMARY

Hence, in order to overcome the deficiencies of the prior art, an object of the present invention is to provide a lens module for LED light sources, which employs the shape of light incident surface and the position of LED light source to shift illumination area and get better light-emitting distribution.

Another object of the present invention is to provide a lens module for LED light sources, which employs the shape of light incident surface and the position of LED light source to increase the utilization rate of the LED light source. To achieve above-mentioned object, the present invention provides a lens module for LED light sources comprising an LED light source and a lens body. The lens body includes a light exiting surface, a light incident surface defining a recess, and a bottom surface connecting the light incident surface and the light exiting surface. The LED light source is received in the recess, and the light incident surface thereof is closer to the LED light source than the light exiting surface. The light incident surface and the light exiting surface are both formed by a plurality of curved surfaces connected with each other. Further, the bottom surface of the lens body is on an assumed reference surface, wherein a point C is defined as a projection point of a center point of the LED light source on the reference surface. The junction of the light incident surface and the reference surface is defined as a closed first curve, wherein an extension line through the point C extended in a first direction intersects the first curve at points A and B. The bee line distance between points A and B is longer than the bee line distance between any two points on the first curve, and a point Q is defined to be the point on the incident surface which has a longest vertical distance away from the reference surface. Those distances between the points should satisfy the condition of: $Z1>Z2$, and $Z3>Y1$. Wherein, $Z1$ denotes the minimum distance between the point A and the point Q; $Z2$ denotes the minimum distance between the point B and the point Q; $Z3$ denotes the minimum distance between the point C and the point Q; and $Y1$ denotes the minimum distance between the point A and the point C.

Further, the relationship between the point C and the points A and B satisfies the condition of: $Y1<Y2$. Wherein, $Y1$ denotes the minimum distance between the point A and the point C, and $Y2$ denotes the minimum distance between the point B and the point C. Wherein, the junction of the light exiting surface and the reference surface is a closed second curve, and an extension line through the point C extended in a first direction intersects the second curve at points D and E. The bee line distance between the point D and the point A is shorter than the bee line distance between the point D and the point B. The relationship between the points C, D and E satisfies the condition of: $Y3>Y4$. Wherein, $Y3$ denotes the minimum distance between point C and point D, and $Y4$ denotes the minimum distance between point C and point E. Further, the relationship between the points A, B, E and D satisfies the condition of: $Y5>Y6$. Wherein, $Y5$ denotes the minimum distance between the point A and the point D, and $Y6$ denotes the minimum distance between the point B and the point E.

Wherein, an extension line through the point C extended in a second direction that is perpendicular to the first direction intersects the first curve at points F and G. Further, a point H is the midpoint between of AC, and a point K is the midpoint of BC; an extension line through the point H extended in the second direction intersects the first curve at points I and J, and an extension line through the point K extended in the second direction intersects the first curve at points L and M. The relationship between the points F, I, J, L and M satisfies the condition of: $X2<X1 \leq X3$. Wherein, $X1$ denotes the minimum distance between point F and point G, $X2$ denotes the minimum distance between the point I and the point J, and X3 denotes the minimum distance between the point L and the point M.

Further, the extension line through the point C extended in the second direction intersects the second curve at points N and P. X4 denotes the minimum distance between the point N and the point P, wherein the relationship between the X1 and X4 satisfies the condition of: X4/X1>1.

Wherein, the lens body includes: a first plane, which is an assumed plane that is perpendicular to the reference surface, points A, B, and C all lying thereon; and a second plane, which is an assumed plane that is perpendicular to the reference surface and the first plane, point C lying thereon. Wherein, the light incident surface is symmetric on both sides with respect to the first plane, and asymmetric with respect to the second plane.

Wherein, the longest axis of the first curve extends at the first direction; the junction of the light exiting surface and the reference surface is a closed second curve; and the longest axis of the second curve extends at a second direction that is perpendicular to the first direction.

Wherein, the light exiting surface further comprises a connection portion in the periphery. The connecting portion allows the curved surface design of the light exiting surface to achieve a desired light distribution, while also allows the size of the lens body to satisfy standard requirements As set forth above, the exemplary embodiments of the present invention is advantageous in that, by using the shape of the light incident surface and the position of LED light source, a light deflection effect is generated, causing the emitted light to shift to the roads or public squares, expanding the illumination range on the roads or public squares, and also increases the utilization rate of the LED light source.

DETAILED DESCRIPTION OF THE EMBODIMENTS

Hereinafter, the preferred embodiment of the present invention will be described in detail with reference to the accompanying drawings, to describe the structures and features of the present invention. It will be understood that the following description is not intended to limit the invention to the form disclosed herein.

Figure 1:
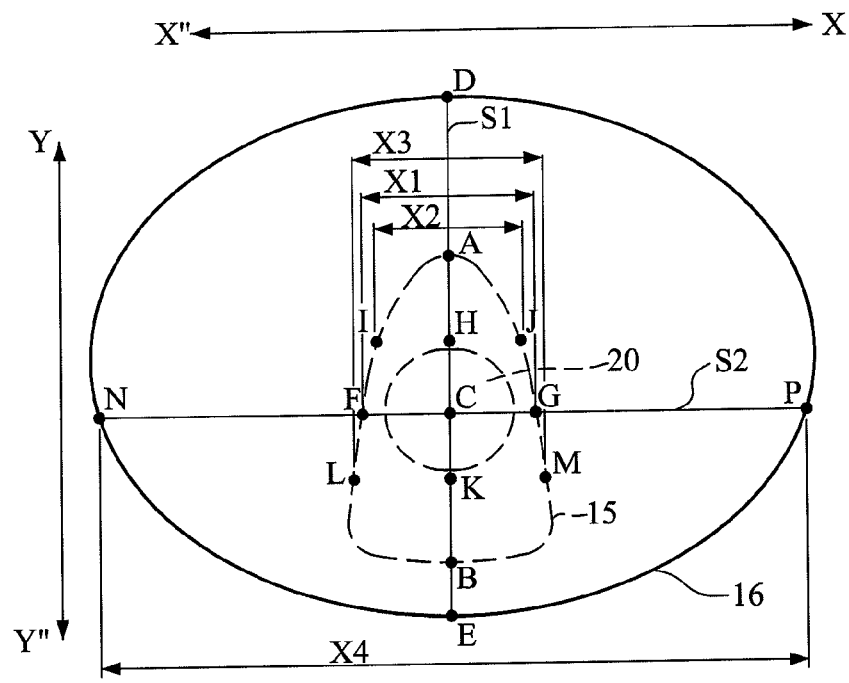
FIG. 1 is a top view illustrating a first embodiment of the present invention.
Figure 2:
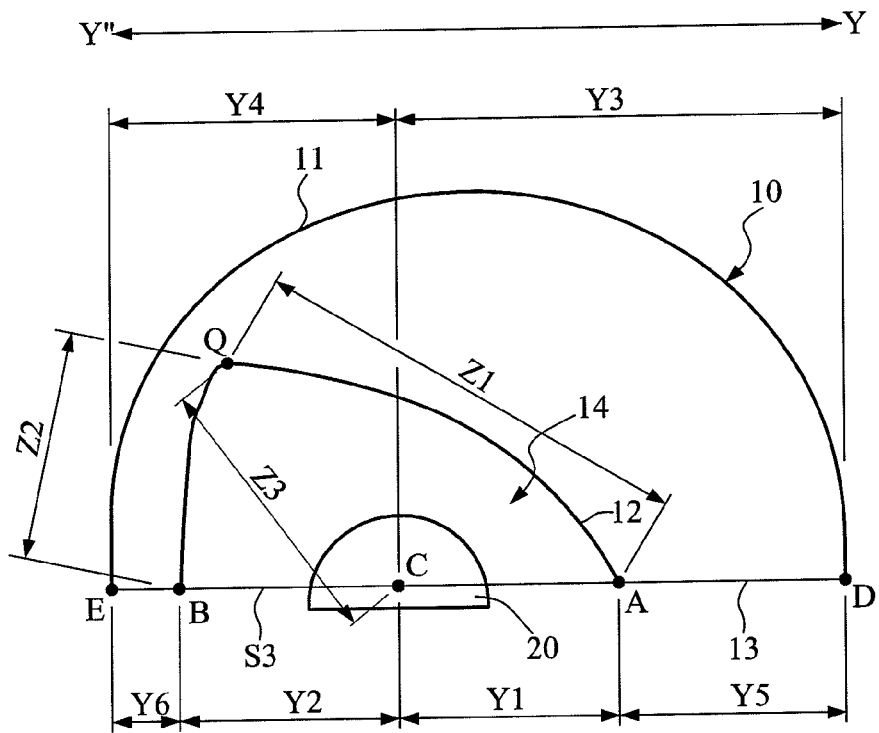
FIG. 2 is a sectional view illustrating the first embodiment of the present invention.
Figure 3:
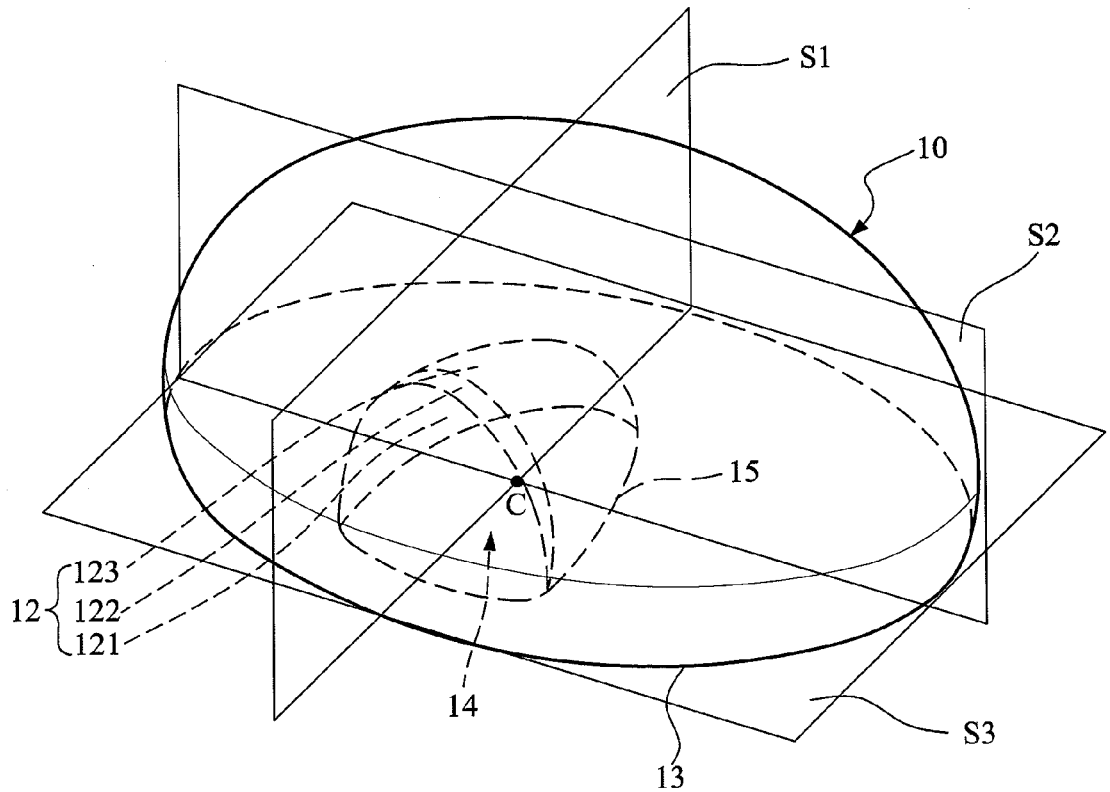
FIG. 3 is a perspective view illustrating the lens body according to the first embodiment of the present invention.

Please refer to FIGS. 1, 2 and 3, which are views illustrating a first embodiment according to the present invention. The present invention provides a lens module for LED light sources, comprising: an LED light source 20 and a lens body 10. The lens body 10 includes a light exiting surface 11, a light incident surface 12 defining a recess 14, and a bottom surface 13 connecting the light incident surface 12 and the light exiting surface 11. The recess 14 is concave in the direction towards the inner side of the lens body 10, and is used to receive the LED light source 20; wherein, the light incident surface 12 thereof is closer to the LED light source 20 than the light exiting surface 11 thereof. In practice, the light incident surface 12 and the light exiting surface 11 are both formed by a plurality of curved surfaces connected with each other. In the first embodiment, the light exiting surface 11 is formed by two curved surfaces connected with each other, and the light incident surface 12 is formed by three curved surfaces connected with each other (curved surfaces 121, 122 and 123 as shown in FIG. 3). When light passes through curved surfaces with different curvatures, it will result in various light-emitting distributions. Hence, by using different curved surfaces, light-emitting distributions of different positions and directions may be easily achieved, thereby satisfying a desired light-emitting requirement. Further, the bottom surface 13 of the lens body 10 is on an assumed reference surface S3, wherein a point C is defined as a projection point of a center point of the LED light source on the reference surface S3. The junction of the light incident surface 12 and the reference surface S3 is defined as a closed first curve 15, wherein an extension line through the point C extended in a first direction intersects the first curve 15 at points A and B. The bee line distance between the points A and B is longer than the bee line distance between any two points on the first curve 15, and a point Q is defined to be the point on the incident surface which has a longest vertical distance away from the reference surface.

Further, the junction of the light exiting surface 11 and the reference surface S3 is a closed second curve 16, and an extension line through the point C extended in the first direction (Y-Y") intersects the second curve 16 at points D and E. The bee line distance between the point D and the point A is shorter than the bee line distance between the point D and the point B.

The extension line through the point C extended in a second direction (X-X") is perpendicular to the first direction (X-X") intersects the first curve 15 at points F and G, and intersects the second curve 16 at points N and P; A point H is the midpoint of AC, and a point K is the midpoint of CB. An extension line through the point H extended in the second direction (X-X") intersects the first curve 15 at points I and J, and an extension line through the point K extended in the second direction (X-X") intersects the first curve at points L and M.

Wherein, the first curve 15 has a maximum bee line distance between two points at the first direction (Y-Y"); and the second curve 16 has a maximum bee line distance between two points at the second direction (X-X"). The lens body 10 includes: a first plane S1, which is an assumed plane that is perpendicular to the reference surface S3, the points A, B, and C all lying thereon; and a second plane S2, which is an assumed plane that is perpendicular to the reference surface S3 and the first plane S1, the point C lying thereon. The light incident surface 12 and the light exiting surface 11 are symmetric on both sides with respect to the first plane S1, and asymmetric with respect to the second plane S2. It is to be noted, the first direction (Y-Y") is a road-width direction, wherein Y is closer to the road, and Y" is farther away from the road; and the second direction (X-X") is a road-length direction.

Wherein, the light incident surface 12 and the light exiting surface 11 are symmetric on both sides with respect to the first plane Si and asymmetric with respect to the second plane S2. The reason the light incident surface 12 and the light exiting surface 11 are asymmetric with respect to the second plane S2, is in that Y side and Y" side have different illumination needs; hence, the light incident surface 12 and the light exiting surface 11 are designed to be asymmetric with respect to the second plane S2, making the emitting light to be closer to the Y side. Further, the reason the light incident surface 12 and the light exiting surface 11 are symmetric on both sides with respect to the first plane S1, is in that illumination needs of X side and X" side are identical; hence, the light incident surface 12 and the light exiting surface 11 are designed to be symmetric on both sides with respect to the first plane S1.

In implementing the first embodiment: Y1=3.1 mm and Y2=3.0 mm, wherein Y1 denotes the minimum distance between the point A and the point C, and Y2 denotes the minimum distance between the point B and the point C; Z1=6.2 mm and Z2=3.1 mm, wherein Z1 denotes the minimum distance between the point A and the point Q, and Z2 denotes the minimum distance between the point B and the point Q; Z3=3.8 mm, wherein Z3 denotes the minimum distance between the point C and the point Q; Y3=6.2 mm and Y4=4.0 mm, wherein Y3 denotes the minimum distance between the point C and the point D, and Y4 denotes the minimum distance between the point C and the point E; Y5=3.1 mm and Y6=1.0 mm, wherein Y5 denotes the minimum distance between the point A and the point D, and Y6 denotes the minimum distance between the point B and the point E; X2=2.7 mm, X1=3.4 mm and X3=3.7 mm, wherein X1 denotes the minimum distance between the point F and the point G, X2 denotes the minimum distance between the point I and the point J, and X3 denotes the minimum distance between the point L and the point M.

In the present embodiment, the following conditions are satisfied: Z1>Z2, Z3>Y1, Y3>Y4, Y5>Y6, and X2<X1<X3. However, in implementation, the condition of X3=X1 is also possible; in other words, the condition may be X2<X1≤X3. Further, X4=14 mm, wherein X4 denotes the minimum distance between the point N and the point P, X4/X1=4.12, and Y5/(Y3+Y4)=0.3.

In the present embodiment, the maximum length of the light exiting surface 11 on the reference surface S3 is 14.5 mm (X-X" direction), and the vertical distance between the highest point of the light exiting surface 11 and the reference surface S3 is 6.0 mm.

Figure 4:
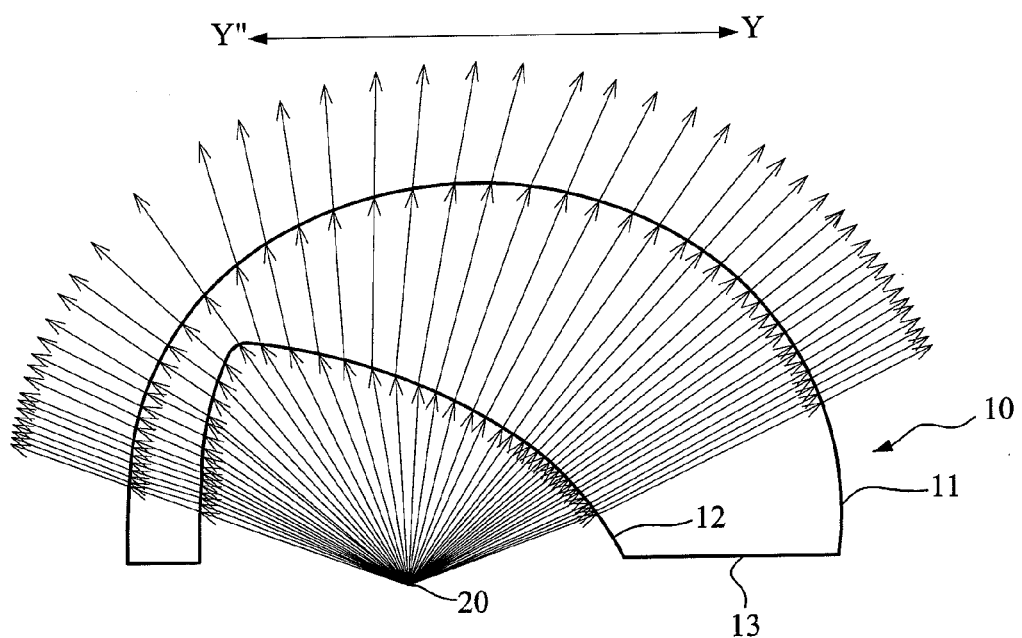
FIG. 4 is a view illustrating the lights according to the first embodiment of the present invention.

Please further refer to FIG. 4, which is a view illustrating the lights according to the first embodiment of the present invention. As shown in FIG. 4, the light emitted from the LED light source 20 is refracted by the light incident surface 12 and the light exiting surface 11 of the lens body 10; this may deflect most of the light to the Y side.

Figure 5:
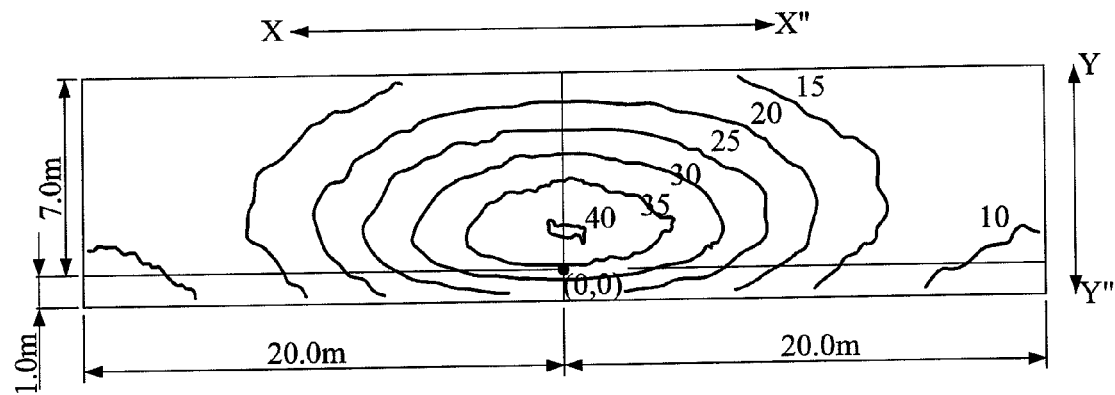
FIG. 5 is a contour map illustrating the light distribution according to the first embodiment of the present invention.

FIG. 5 is a contour map illustrating the light distribution according to the first embodiment of the present invention. It simulates an illumination condition in which a road lamp that is eight meters in height and a plurality of lens modules for LED light sources is used, and luminous flux is approximately 10000 lm. As shown in the figure, coordinate (0,0) is where the head of the lamp is. The light is concentrated at the Y side, and road-width under illumination (the width in the first direction (Y-Y")) may be up to 8 meters, the road-length under illumination (the width in the second direction (X-X")) may be up to 40 meters, the overall uniformity (minimum illuminance average illuminance)>0.4 (which is the standard specification in Taiwan). Therefore, the design used in the first embodiment may employ a light deflection effect thereof to direct the light to the roads, thereby allowing excellent illumination uniformity.

Figure 6:
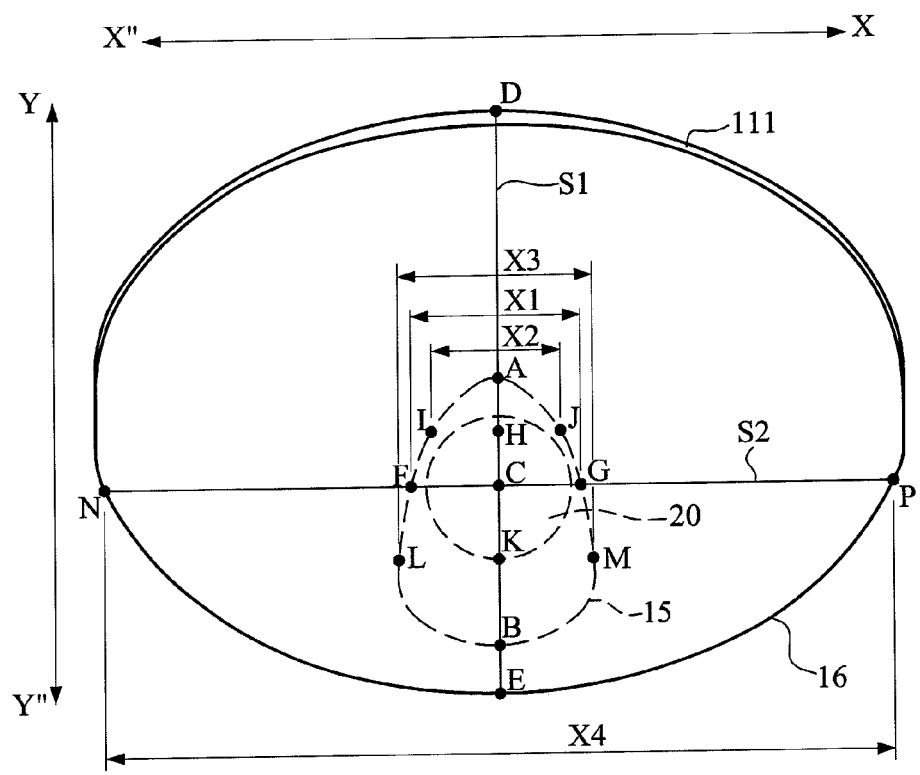
FIG. 6 is a top view illustrating a second embodiment of the present invention.
Figure 7:
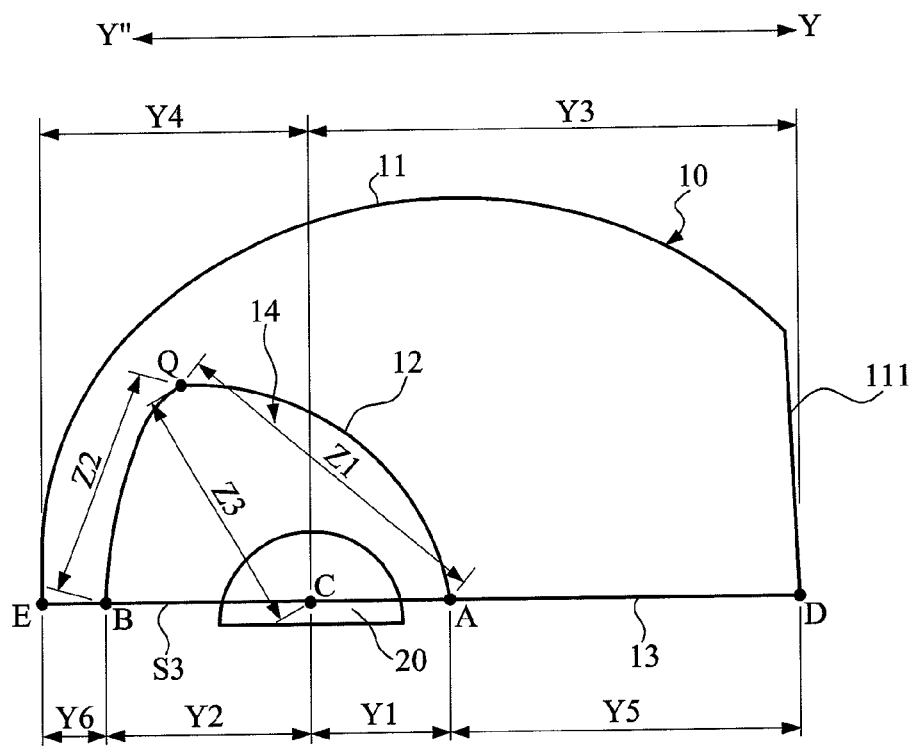
FIG. 7 is a sectional view illustrating the second embodiment of the present invention.
Figure 8:
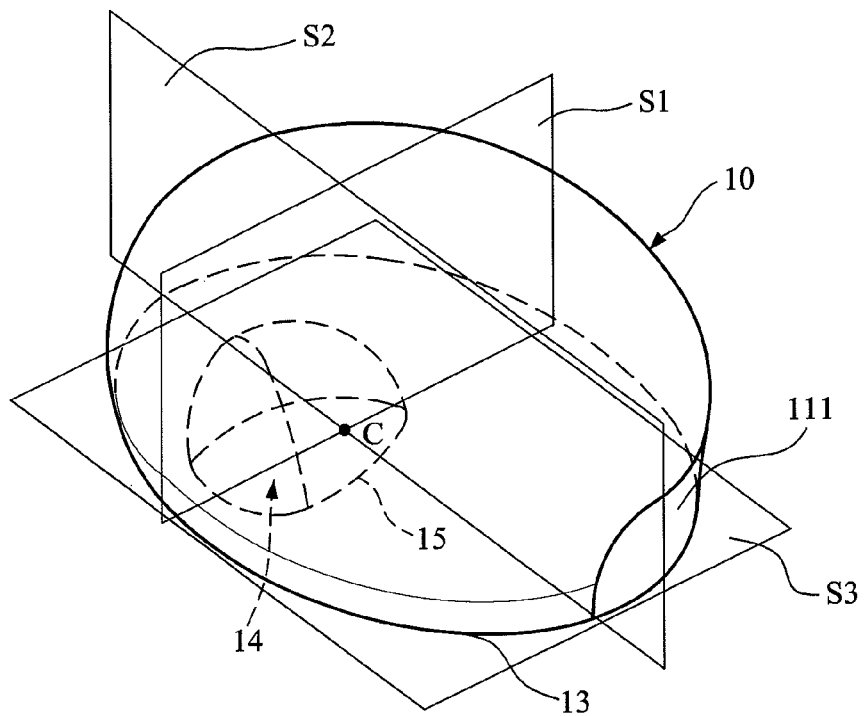
FIG. 8 is a perspective view illustrating the lens body according to the second embodiment of the present invention.

Referring to FIGS. 6, 7 and 8, which are views illustrating a second embodiment according to the present invention. Similar to the first embodiment, the light exiting surface 11 in the present embodiment is formed by two curved surfaces connected with each other; and the light incident surface 12 in the present embodiment is formed by two curved surfaces connected with each other. The light exiting surface 11 further comprises a connection portion 111 in the periphery. The connecting portion 111 is mainly used to allow the light exiting surface 11 to achieve a desired light distribution, while also allow the size of the lens body to satisfy standard requirements, so that it may be installed inside the lamp.

In implementing the second embodiment: Y1=2.0 mm and Y2=3.0 mm; Z1=4.5 mm, Z2=3.0 mm and Z3=3.5 mm; Y3=7.0 mm and Y4=4.0 mm; Y5=5.0 mm and Y6=1.0 mm; X1=3.0 mm, X2=2.5 mm and X3=3.5 mm; and X4=13.8 mm, wherein X4/X1=4.6, and Y5/(Y3+Y4)=0.45.

In the present embodiment, the following conditions are satisfied: Z1>Z2, Z3>Y1, Y3>Y4, Y5>Y6, X2<X1≤X3, and Y2>Y1. Further, the maximum length of the light exiting surface 11 on the reference surface S3 is 14.5 mm, and the vertical distance between the highest point of the light exiting surface 11 and the reference surface S3 is 5.5 mm.

Figure 9:
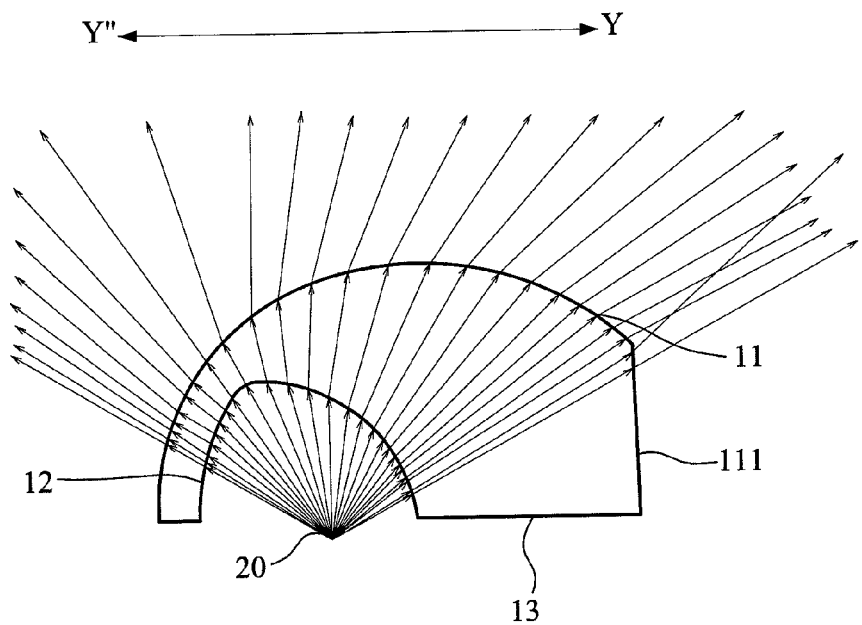
FIG. 9 is a view illustrating the lights according to the second embodiment of the present invention.

Please further refer to FIG. 9, which is a view illustrating the lights according to the second embodiment of the present invention. As shown in FIG. 9, the light emitted from the LED light source 20 is refracted by the light incident surface 12 and the light exiting surface 11 of the lens body 10; this may deflect most of the light to the Y side.

Figure 10:
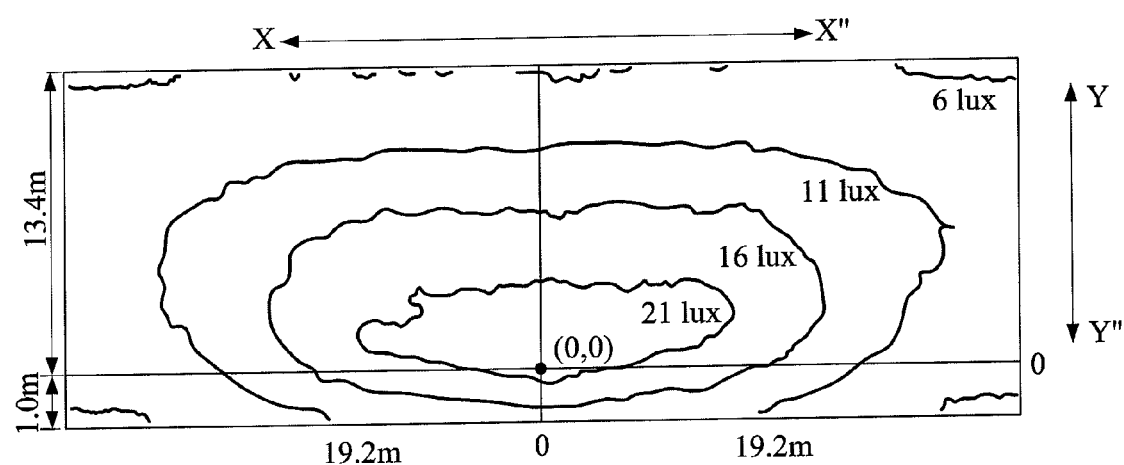
FIG. 10 is a contour map illustrating the light distribution according to the second embodiment of the present invention.

FIG. 10 is a contour map illustrating the light distribution according to the second embodiment of the present invention. It also simulates an illumination condition in which a road lamp that is eight meters in height and a plurality of lens modules for LED light sources is used, and luminous flux is approximately 10000 lm. As shown in the figure, coordinate (0,0) is where the head of the lamp is. The light is concentrated at the Y side, and road-width under illumination (the width in the first direction (Y-Y")) may be up to 14.4 meters, the road-length under illumination (the width in the second direction (X-X")) may be up to 38.4 meters, the overall uniformity (minimum illuminance/average illuminance)>0.4. Therefore, the design used in the second embodiment may employ a light deflection effect thereof to direct the light to the road, thereby allowing excellent illumination uniformity. Since the value of Y5/(Y3+Y4) in the second embodiment is larger than that of the first embodiment, the road-width under illumination in the second embodiment is larger than that of the first embodiment. In other words, the second embodiment is appropriate for places in need of wider illumination, such as multilane roads.

Figure 11:
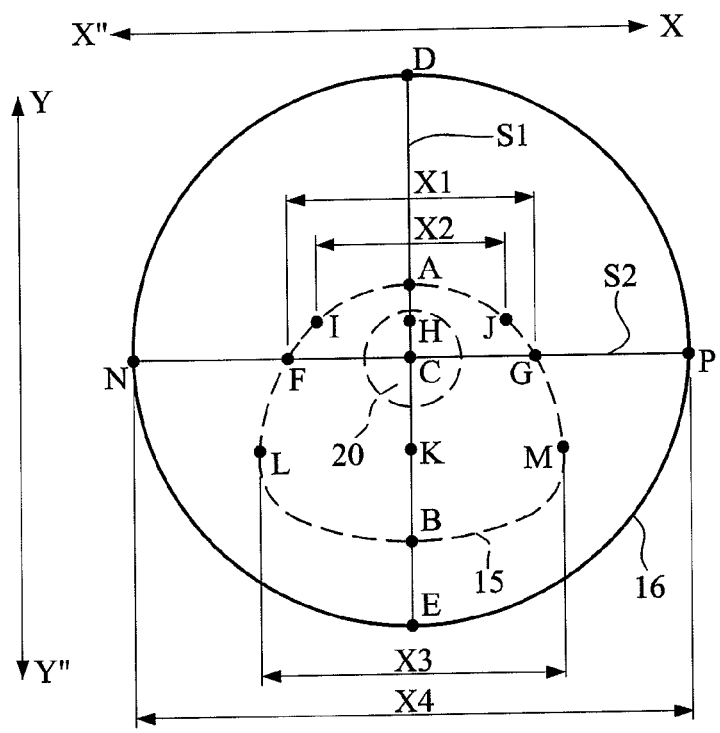
FIG. 11 is a top view illustrating a third embodiment of the present invention.
Figure 12:
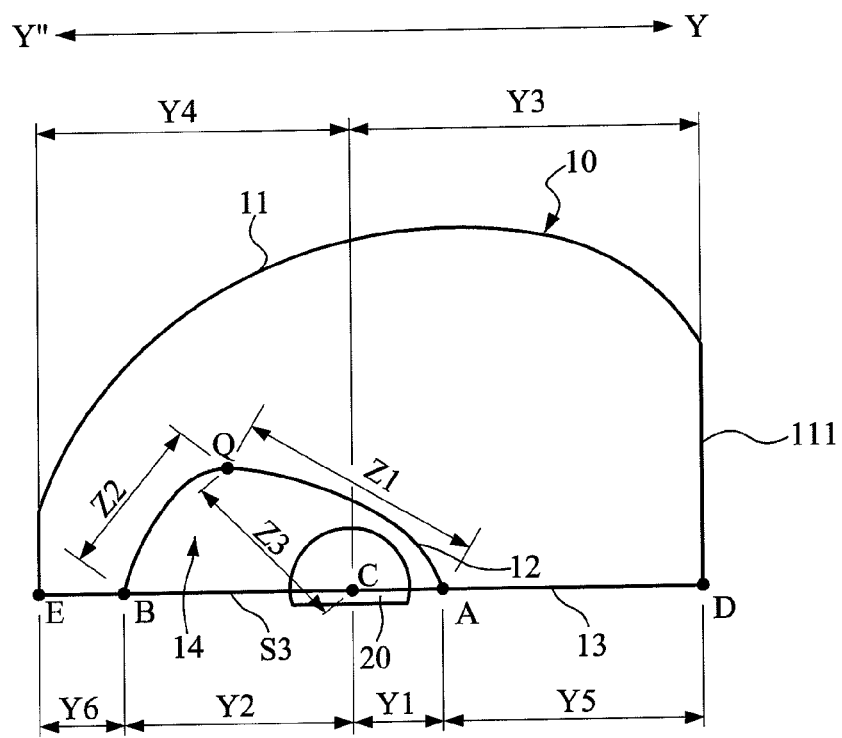
FIG. 12 is a sectional view illustrating the third embodiment of the present invention.
Figure 13:
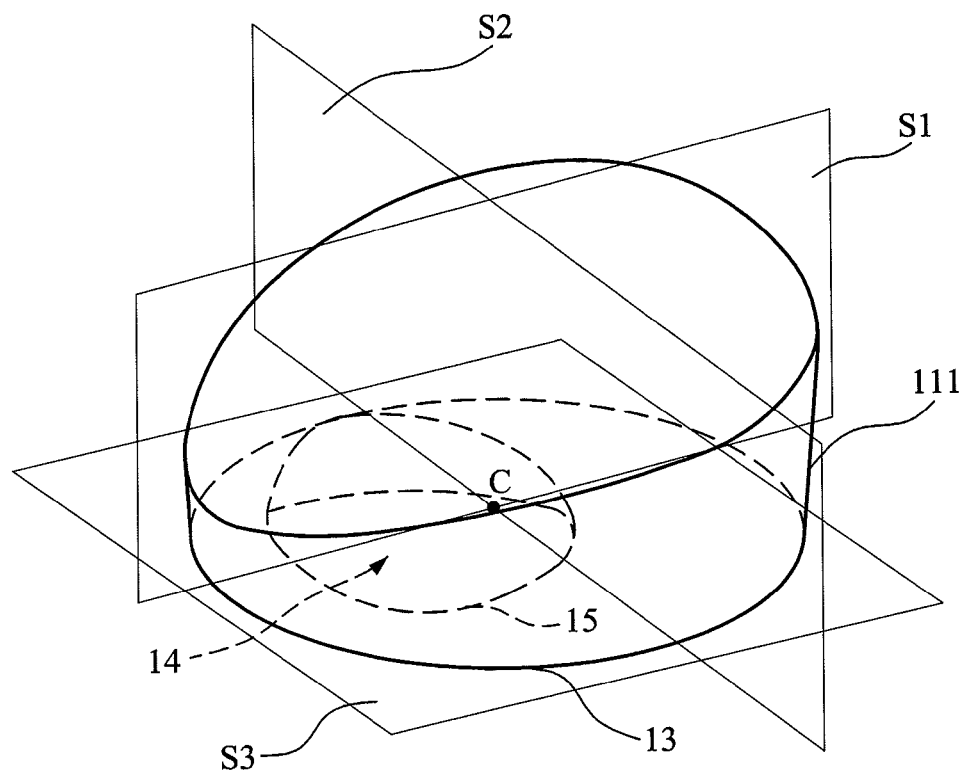
FIG. 13 is a perspective view illustrating the lens body according to the third embodiment of the present invention.

Please further refer to FIGS. 11, 12 and 13, which are views illustrating a third embodiment according to the present invention. Similar to the first embodiment, the light exiting surface 11 in the present embodiment is formed by two curved surfaces connected with each other; and the light incident surface 12 in the present embodiment is formed by two curved surfaces connected with each other. The light exiting surface 11 further comprises a connection portion 111 in the periphery.

In implementing the third embodiment: Y1=2.2 mm and Y2=5.0 mm; Z1=5.5 mm, Z2=3.5 mm and Z3=4.0 mm; Y3=7.5 mm and Y4=6.5 mm; Y5=5.3 mm and Y6=1.5 mm; X1=6.5 mm, X2=5.0 mm and X3=8.0 mm; and X4=14.5 mm, wherein X4/X1=2.23, and Y5/(Y3+Y4)=0.38.

In the present embodiment, the following conditions are satisfied: Z1>Z2, Z3>Y1, Y3>Y4, Y5>Y6, X2<X1≤X3, and Y2>Y1. Further, the maximum length of the light exiting surface 11 on the reference surface S3 is 14.5 mm, and the vertical distance between the highest point of the light exiting surface 11 and the reference surface S3 is 8.0 mm.

Figure 14:
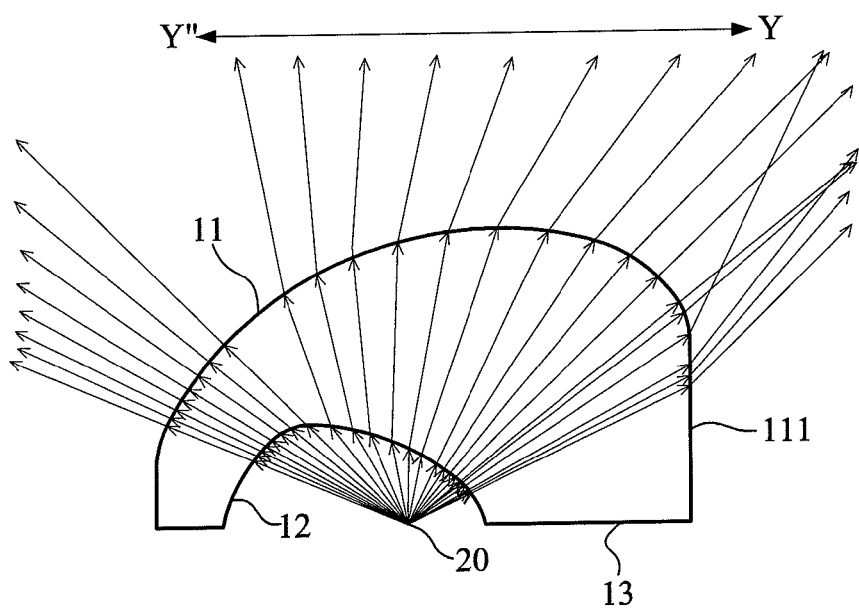
FIG. 14 is a view illustrating the lights according to the third embodiment of the present invention.

Please further refer to FIG. 14, which is a view illustrating the lights according to the third embodiment of the present invention. As shown in FIG. 14, the light emitted from the LED light source 20 is refracted by the light incident surface 12 and the light exiting surface 11 of the lens body 10; this may deflect most of the light to the Y side.

Figure 15:
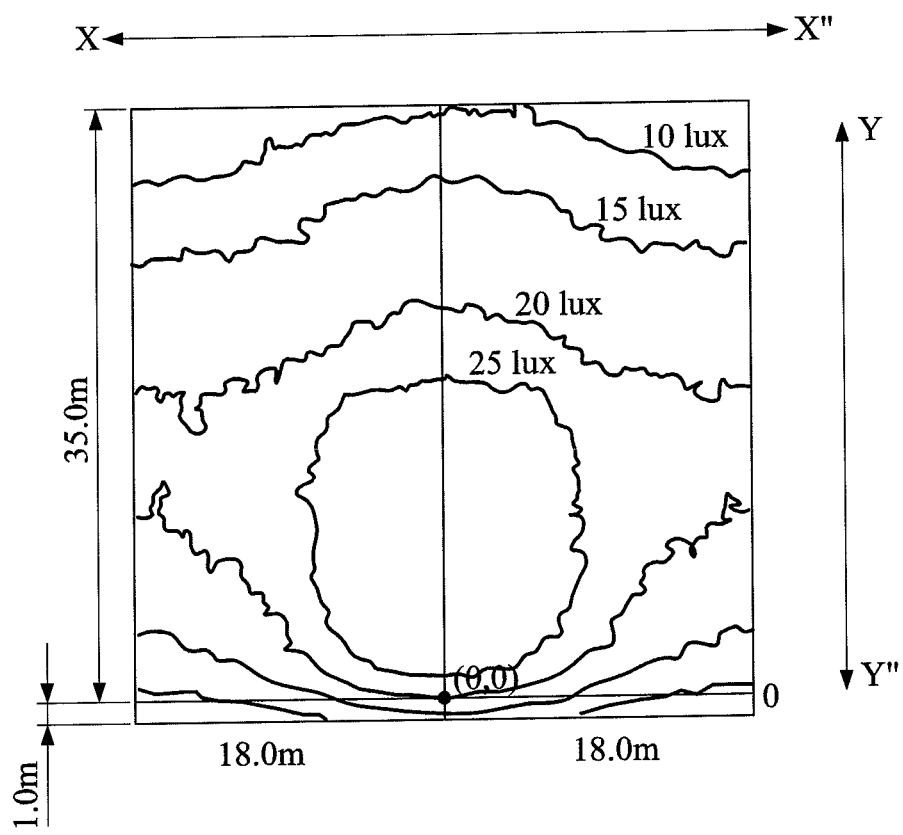
FIG. 15 is a contour map illustrating the light distribution according to the third embodiment of the present invention.

FIG. 15 is a contour map illustrating the light distribution according to the third embodiment of the present invention. It simulates an illumination condition in which a road lamp that is eighteen meters in height and a plurality of lens modules for LED light sources is used, and luminous flux is approximately 30000 lm. As shown in the figure, coordinate (0,0) is where the head of the lamp is. The light is concentrated at the Y side, and road-width under illumination (the width in the first direction (Y-Y")) may be up to 36 meters, the road-length under illumination (the width of the second direction (X-X")) may be up to 36 meters, the overall uniformity (minimum illuminance/average illuminance)>0.4. Therefore, the design used in the third embodiment may employ a light deflection effect thereof to direct the light to the road, thereby allowing excellent illumination uniformity. Since the ratio of X4/X1 in the third embodiment is smaller than that of the first and second embodiment, the road-length under illumination in the third embodiment is shorter than that of the first and second embodiment. On the other hand, since the value of Y5/(Y3+Y4) in the third embodiment is larger than that of the first and second embodiment, light is deflected by an angle of inclination to the Y direction; therefore, the road-width under illumination in the third embodiment is larger than that of the first and second embodiment. That is, the third embodiment is appropriate for places in need of wider but shorter illumination, such as public squares.

The following table shows the values of the lens body according to the three embodiments:

|    | FIRST EMBODIMENT | SECOND EMBODIMENT | THIRD EMBODIMENT |
| --- | --- | --- | --- |
| Y1 | 3.1 mm | 2.0 mm | 2.2 mm |
| Y2 | 3.0 mm | 3.0 mm | 5.0 mm |
| Y3 | 6.2 mm | 7.0 mm | 7.5 mm |
| Y4 | 4.0 mm | 4.0 mm | 6.5 mm |
| Y5 | 3.1 mm | 5.0 mm | 5.3 mm |
| Y6 | 1.0 mm | 1.0 mm | 1.5 mm |
| Z1 | 6.2 mm | 4.5 mm | 5.5 mm |
| Z2 | 3.1 mm | 3.0 mm | 3.5 mm |
| Z3 | 3.8 mm | 3.5 mm | 4.0 mm |
| X1 | 3.4 mm | 3.0 mm | 6.5 mm |
| X2 | 2.7 mm | 2.5 mm | 5.0 mm |
| X3 | 3.7 mm | 3.5 mm | 8.0 mm |
| X4 | 14.0 mm | 13.8 mm | 14.5 mm |
| X4/X1 | 4.12 | 4.60 | 2.23 |

As shown in the table, the position of the LED light source 20 and the shapes of the light exiting surface 11 and the light incident surface 12 satisfy the condition of:

Z1>Z2;

Z3>Y1;

Y3>Y4;

Y5>Y6;

X2<X1≤X3;

X4/X1>1; and further, Y2>Y1.

The present invention is advantageous in that: by using the shape of the light incident surface 12 and the position of the LED light source 20, a light deflection effect may be generated. The advantages of the foregoing conditions are described as below.

The conditions of Z1>Z2 and Z3>Y1 are mainly used to let the center of the LED light source 20 to be closer to the light incident surface 12. This allows a part of the light emitted from the LED light source 20 that is closer to the Y side to directly pass through the light incident surface 12 and then exits from the light exiting surface 11. This part of light has small refraction angle, is not easily dispersed, and can illuminate farther; hence, the illumination at the Y side is improved, thereby achieving a light deflection effect. Another part of the light passes through the light incident surface 12 and then concentrated at the Y side. This increases the quantity of emitting light at the Y side, and decreases the light quantity at the Y" side, thereby increasing utilization rate of the LED light source 20 on the road. If Z1<Z2 or Z3<Y1 (meaning that the center of the LED light source 20 is farther away from the light incident surface 12), then since the light emitted from the LED light source 20 has a particular angle, when the LED light source 20 is too far away from the light incident surface 12, only part of the light incident surface 12 at the Y side may be used. This prevents the light incident surface 12 at the Y side from fully using the emitting light, thereby causing difficulty in directing the light to the Y side, and weakens the light deflection effect.

The condition of Y2>Y1 is mainly used to let the LED light source 20 to be closer to the light incident surface at the Y side, making it easier for the emitting light to be deflected by the light incident surface towards the Y side. The conditions of Y3>Y4 and Y5>Y6 are made to increase the illumination in length on the Y side, directing the emitted light to the road or public squares, increases the illumination in width at the road or public squares, and increases utilization rate of the LED light source.

The condition of X2<X1≤X3 is mainly used to make the light emitted from the LED light source 20 to deflect. After the emitting light is refracted, it shifts to the road-length direction (the second direction (X-X")) at the Y side, in other words, within the desired range; this may increase utilization rate of the LED light source 20 on the road.

The previous description of the preferred embodiment is provided to further describe the present invention, not intended to limit the present invention. Any modification apparent to those skilled in the art according to the disclosure within the scope will be construed as being included in the present invention.

What is claimed is:

1. A lens module for LED light sources, comprising:
   an LED light source; and
   a lens body, comprising a light exiting surface, a light incident surface defining a recess, and a bottom surface connecting the light incident surface and the light exiting surface, the LED light source received in the recess, the light incident surface being closer to the LED light source than the light exiting surface; wherein, the bottom surface is on an assumed reference surface, a point C is defined as a projection point of a center point of the LED light source on the reference surface, a junction of the light incident surface and the reference surface is defined as a closed first curve, an extension line through the point C extended in a first direction intersects the first curve at points A and B, a bee line distance between the points A and B is longer than a bee line distance between any two points on the first curve, and a point Q is defined to be the point on the incident surface which has a longest vertical distance away from the reference surface; those minimum distances between the points satisfy conditions of: Z1>Z2, and Z3>Y1;
   wherein, Z1 denotes a minimum distance between the point A and the point Q; Z2 denotes a minimum distance between the point B and the point Q; Z3 denotes a minimum distance between the point C and the point Q; and Y1 denotes a minimum distance between the point A and the point C.

2. The lens module for LED light sources of claim 1, wherein a relationship between the point C and the points A and B satisfies a condition of: Y1<Y2; wherein, Y1 denotes the minimum distance between the point A and the point C, and Y2 denotes a minimum distance between the point B and the point C.

3. The lens module for LED light sources of claim 1, wherein a junction of the light exiting surface and the reference surface is a closed second curve, an extension line through the point C extended in the first direction intersects the second curve at points D and E, a bee line distance between the point D and the point A is shorter than a bee line distance between the point D and the point B; a relationship between the points C, D and E satisfies a condition of: Y3>Y4, wherein Y3 denotes a minimum distance between the point C and the point D, and Y4 denotes a minimum distance between the point C and the point E.

4. The lens module for LED light sources of claim 1, wherein a junction of the light exiting surface and the reference surface is a closed second curve, an extension line through the point C extended in the first direction intersects the second curve at points D and E, a bee line distance between the point D and the point A is shorter than a bee line distance between the point D and the point B; a relationship between the points A, B, E and D satisfies a condition of: Y5>Y6, wherein Y5 denotes a minimum distance between the point A and the point D, and Y6 denotes a minimum distance between the point B and the point E.

5. The lens module for LED light sources of claim 1, wherein an extension line through the point C extended in a second direction that is perpendicular to the first direction intersects the first curve at points F and G, a point H is a midpoint of AC, a point K is a midpoint of BC, an extension line through the point H extended in the second direction intersects the first curve at points I and J, and an extension line through the point K extended in the second direction intersects the first curve at points L and M; a relationship between the points F, G, I, J, L and M satisfies a condition of: X2<X1≤X3, wherein X1 denotes a minimum distance between the point F and the point G, X2 denotes a minimum distance between the point I and the point J, and X3 denotes a minimum distance between the point L and the point M.

6. The lens module for LED light sources of claim 1, wherein a junction of the light exiting surface and the reference surface is a closed second curve, an extension line through the point C extended in a second direction that is perpendicular to the first direction intersects the first curve at points F and G, and intersects the second curve at points N and P; wherein X1 denotes a minimum distance between the point F and the point G, and X4 denotes a minimum distance between the point N and the point P, a relationship between the X1 and X4 satisfies a condition of: X4/X1>1.

7. The lens module for LED light sources of claim 1, wherein the lens body includes: a first plane, which is an assumed plane that is perpendicular to the reference surface, the points A, B, and C all lying thereon; and a second plane, which is an assumed plane that is perpendicular to the first plane, the point C lying thereon; the light incident surface and the light exiting surface are symmetric on both sides with respect to the first plane, and asymmetric with respect to the second plane.

8. The lens module for LED light sources of claim 1, wherein the light incident surface is formed by a plurality of curved surfaces connected with each other, and the light exiting surface is formed by a plurality of curved surfaces connected with each other.

9. The lens module for LED light sources of claim 1, wherein the longest axis of the first curve extends at the first direction ; a junction of the light exiting surface and the reference surface is a closed second curve, the longest axis of the second curve extends at a second direction that is perpendicular to the first direction.

10. The lens module for LED light sources of claim 1, wherein the light exiting surface further comprising a connection portion in the periphery.

* * * * *